United States Patent

Kim

[11] Patent Number: 5,979,071
[45] Date of Patent: Nov. 9, 1999

[54] PISTON RING GAP MEASURING DEVICE FOR A VEHICLE

[75] Inventor: Seung-Woo Kim, Suwon, Rep. of Korea

[73] Assignee: Hyundai Motor Company, Seoul, Rep. of Korea

[21] Appl. No.: 08/979,342

[22] Filed: Nov. 26, 1997

[30] Foreign Application Priority Data

Dec. 10, 1996 [KR] Rep. of Korea ...................... 96-69021

[51] Int. Cl.[6] .................................................. G01D 21/00
[52] U.S. Cl. ............................... 33/605; 33/544.4; 33/549
[58] Field of Search ..................... 33/605, 600, 501.45, 33/501, 655, 542, 544.4, 549

[56] References Cited

U.S. PATENT DOCUMENTS

| | | | |
|---|---|---|---|
| 1,264,519 | 4/1918 | Hinson | 33/514.1 |
| 5,038,449 | 8/1991 | Huggins, Jr. | 33/605 |
| 5,042,161 | 8/1991 | Hodge | 33/501.45 |
| 5,199,180 | 4/1993 | Yablonsky | 33/501.45 |

*Primary Examiner*—Andrew Hirshfeld

[57] ABSTRACT

A piston ring gap measuring device for a vehicle includes a master bore having a guide slit on one side and a thickness gauge on the other side. A tolerance scale is provided adjacent to the guide slit and corresponds to tolerance thicknesses of the thickness gauge. A piston ring may be placed onto a ring supporting disk and moved downwardly into the master bore until the piston ring gap encounters a part of the thickness gauge having a thickness dimension greater than the gap thickness. The gap thickness can be obtained from the tolerance scale. The ring supporting disk includes guide tabs movable within grooves in the master bore, and the ring supporting disk is biased upwardly.

2 Claims, 4 Drawing Sheets

PISTON RING GAP MEASURING DEVICE FOR A VEHICLE

BACKGROUND OF THE INVENTION

The present invention relates to a piston ring gap measuring device for a vehicle which is able to exactly and rapidly measure a gap of a piston ring.

In general, a piston ring is made to be inserted into a ring groove of a piston and reciprocate within the cylinder together with the piston and in close contact with the cylinder wall. Three big operations are thus achieved, such as an air tight operation for preventing mixed gas compression leakage between the cylinder and the piston as well as combustion gas leakage; an oil removing operation for sweeping away the excessive oil which provides lubrication between the cylinder and the piston thereby preventing its entrance into the combustion chamber; and a thermal conductive operation for conducting most of the heat received by the cylinder head to the outside of the cylinder.

Accordingly, the piston ring is made of a structure in which a part thereof is cut open to define a predetermined gap which provides appropriate resiliency, and usually consists of 2–3 compression rings and 1–2 oil rings.

Recently, problems have arisen whereby when a gap of the piston ring being cut is large, a gas would leak therefrom, and when the gap is too small, both the ends would contact due to thermal expansion causing seizure or damage.

Accordingly, a conventional method for measuring a gap of the piston ring is provided whereby the piston ring is resiliently widened to closely contact the cylinder wall and is compressed and inserted thereinto so as to maintain a horizontal level so that the cut gap can be measured by a thickness gauge or a feeler gauge, However, in order to measure the gap of a piston, the piston ring should be inserted within the cylinder wall exactly at a horizontal level. However, there has been the problem that it is uncertain as to whether or not the horizontal level has been exactly maintained or that the gap can be exactly measured without erroneous reading errors.

SUMMARY OF THE INVENTION

Therefore, it is an object of the present invention to provide a piston ring gap measuring device for a vehicle which can exactly and rapidly measure the gap of a piston ring.

The present invention provides a piston ring gap measuring device comprising: a master bore having a guide slit which is cut longitudinally in the axial direction from the top edge to a predetermined level at one side of the cylinder and having a diameter the same as the inner diameter of the cylinder of a vehicle. A tolerance scale which gradually increases at each interval is provided at the external surface along the guide slit, A thickness gauge which has a tower-like configuration whereby the tolerance thickness becomes gradually larger from the top to the bottom thereof is fixed in the axial direction at the side of the internal surface of the master bore. The piston ring then drops within the master bore until the gap of the piston ring can no longer pass the tolerance thickness portion of the master bore. A ring supporting disc which supports and maintains the horizontal position of the piston ring is guided in grooves provided on the internal surface of the master bore with the groove corresponding to the thickness gauge being larger than the maximum tolerance thickness so that it passes from the top toward the bottom of the thickness gauge. A resiliency means which resiliently supports the ring supporting disc is biased in the upward direction. A ring pressing disc contains a guide means and a groove provided at the periphery thereof at mutually opposing positions for engaging the guide slit and the thickness gauge of the master bore, said thickness gauge being bigger than the maximum tolerance thickness so that it can pass from the top to the bottom of the thickness gauge. A handle bar extends from the top surface of the ring pressing disc where it can be gripped so that a horizontal level of the piston ring can be maintained until the gap of the piston ring will not pass the thickness gauge.

In another feature of the present invention, horizontal, level-maintaining guide grooves are formed along the axial direction at both sides of the internal circumferential surface of the master bore between the guide slit and the thickness gauge, and guide taps which extend from the periphery of the ring supporting disc are adapted to engage the guide grooves for maintaining the ring supporting disc in a substantially horizontal position.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described in more detail with reference to the accompanying drawings.

Figure 1:
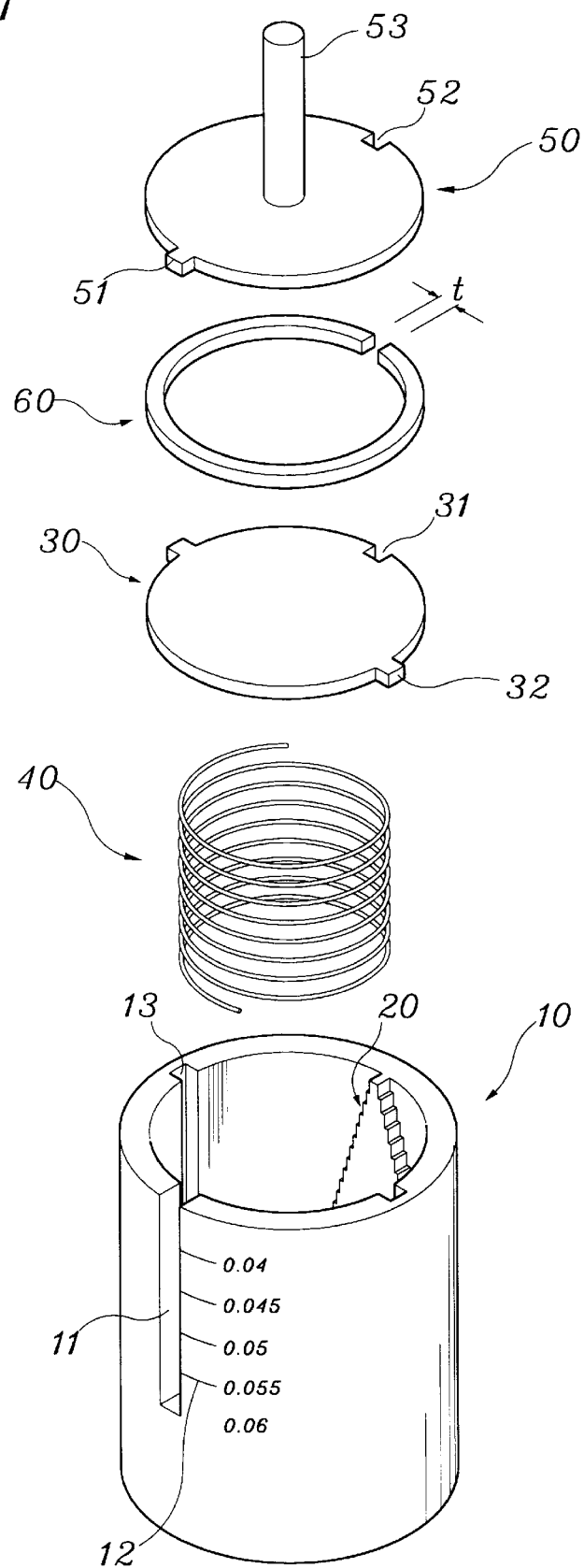
FIG. 1 is an exploded, perspective view showing a piston ring gap measuring device for a vehicle according to the present invention.
Figure 2:
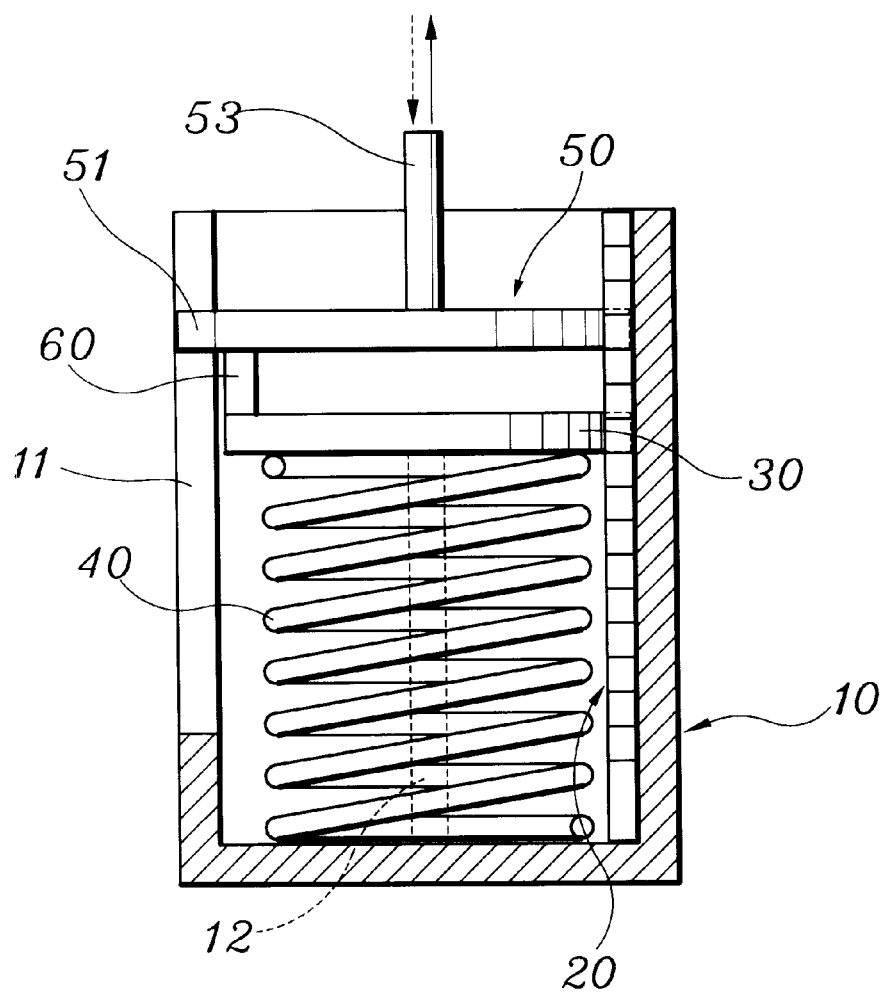
FIG. 2 is a cross-sectional view showing an assembled state of the piton ring gap measuring device.
Figure 3:
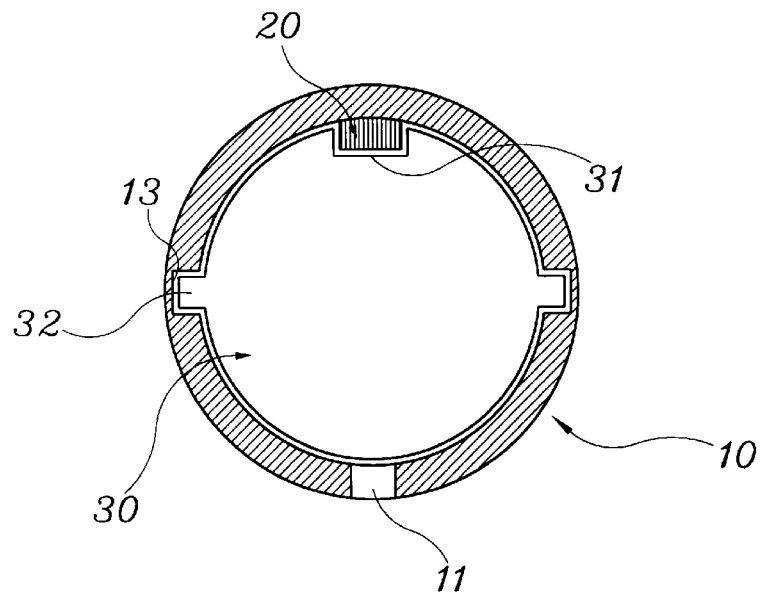
FIG. 3 is a lateral cross-sectional view showing an assembled state of a ring supporting disc.
Figure 4:
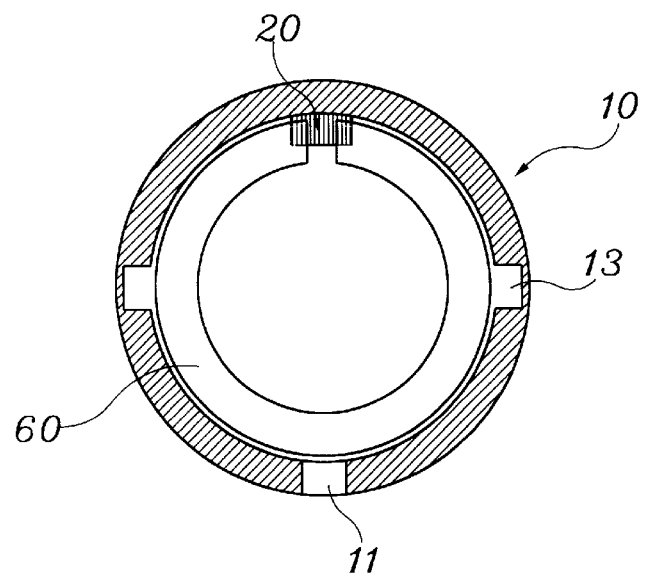
FIG. 4 is a lateral cross-sectional view showing an assembled state of a piston ring.
Figure 5:
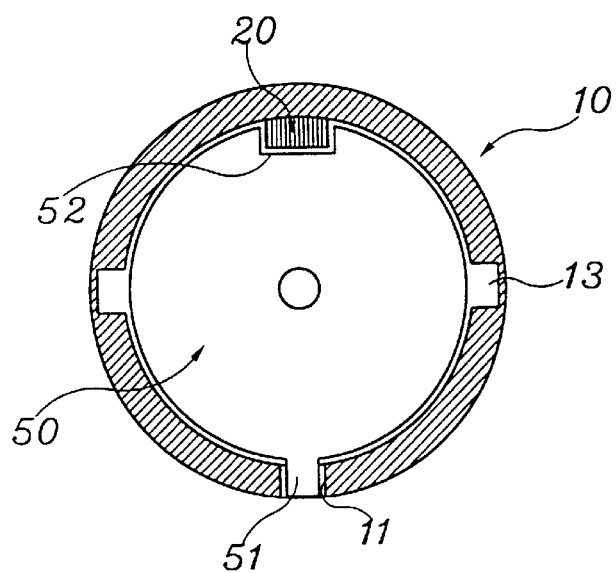
FIG. 5 is a lateral cross-sectional view showing an assembled state of a ring pressing disc.
Figure 6:
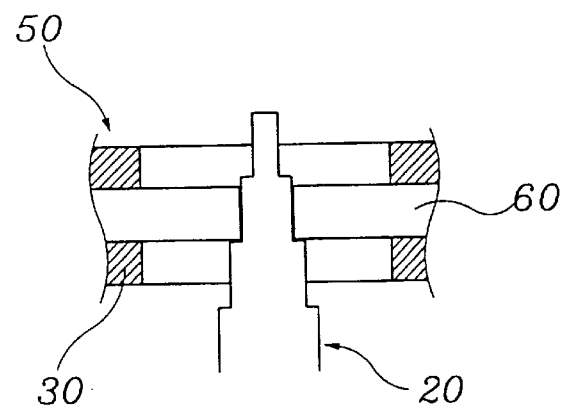
FIG. 6 is a fragmentary, longitudinal, cross-sectional view showing an essential part which measures the gap of the piston ring by a thickness gauge.

FIG. 1 is an exploded, perspective view showing a piston ring gap measuring device for a vehicle of the present invention. FIG. 2 is a cross-sectional view showing an assembled state of the piston ring gap measuring device. FIG. 3 is a lateral, cross-sectional view showing an assembled state of a ring supporting disc. FIG. 4 is a lateral, cross-sectional view showing an assembled state of a piston ring. FIG. 5 is a lateral cross-sectional view showing an assembled state of a piston ring disc. FIG. 6 is a fragmentary, longitudinal, cross-sectional view showing an essential part which measures the gap of the piston ring by a thickness gauge.

The reference numeral 10 refers to a master bore processed to a cylinder having a diameter which is the same as the inner diameter of a cylinder of a vehicle. A guide slit 11 is cut out in the longitudinal direction at the side of the mater bore 10 along the axial direction from the top end to the bottom thereof at a predetermined level, and tolerance scales 12 are provided along the external circumferential surface at the guide slit 11, said scales gradually increasing at each interval.

The tolerance scales 12 indicate intervals of 0.005 mm such as 0.04, 0.045, 0.05, 0.055, 0.06.

Opposing level maintaining guide grooves 13 are respectively formed in the axial direction at both sides of the internal, circumferential surface of the master bore 10, and are positioned at the central position between the guide slit 11 and a thickness gauge 20.

The thickness gauge 20 is processed to have a tower shape so that the tolerance thickness becomes gradually larger when proceeding from the top to bottom so as to correspond with the tolerance scales 12 of the master bore 10. The thickness gauge 20 closely adheres to and is fixed in the axial direction at the side of the internal circumferential surface where it is positioned on the opposite side from the guide slit 11 of the master bore 10. The piston ring is dropped into the master bore until the gap t of the piston ring 60 engages the thickness gauge, enabling the tolerance scale 12 of the tolerance thickness portion to be read, said reading corresponding to the gap t.

The tolerance thicknesses of the thickness gauge 20 are formed gradually larger in intervals of 0.005 mm, such as, for example, 0.04, 0.045, 0.05, 0.055, 0.06 mm.

Element 30 is a ring supporting disc for supporting and exactly maintaining the horizontal level of piston ring 60. An interference preventing groove 31 is formed at the side of the external circumferential surface of the ring supporting disc to be bigger than the maximum tolerance thickness so that it passes from the top to the bottom of the thickness gauge 20, effecting an up-and-down movement within the internal circumferential surface of the master bore 10. Guide tabs 32 project from the external circumferential surface of the ring supporting disc 30 so that when the ring supporting disc 30 is dropped into the guide grooves 13 on both sides of the master bore 10, a horizontal level can be exactly maintained.

Element 40 is a resiliency means for resiliently supporting the ring supporting disc 30 so that it can be automatically returned to an upward position upon the discontinuance of the external force after measuring the gap t of the piston ring 60. The piston ring 60 is also returned by sliding upwardly on the internal circumferential surface of the master bore 10 when the external force is removed and when it has a stronger resiliency than the tensile and compression strength of the piston ring 60. Although a coil spring is used for the resiliency means 40 in the present invention, any equivalent element can be used as long as it functions in the same manner.

Element 50 is a ring pressing disc for applying an external pressing force to compress the resiliency means 40 until the gap t of the piston ring 60 does not pass the thickness gauge 20 while maintaining the horizontal level of the piston ring 60. The ring pressing disc 50 is provided with a guide 51 and an interference preventing groove 52 at the external, circumferential surface of the ring pressing disc at mutually opposing positions The slit 11 with the tolerance scale 12 receives the guide 51 of the ring pressure disc. The slit 11 of the master bore 10 has a maximum tolerance greater than the thickness from the top to the bottom of the thickness gauge 20, and a handle bar 53 protrudes from the top center of the ring pressure disc so that an operator can grip the device.

The method of measuring the gap in a piston ring gap measuring device for a vehicle according to the present invention is as follows.

When desiring to measure the gap t of the piston ring 60, when the resiliently opened piston ring 60 is compressed and inserted into the master bore 10 of a cylinder having a diameter identical with the inner diameter of the cylinder of a vehicle, in a state where the ring supporting disc 30 is raised by the resiliency means 40, the piston ring 60 maintains a natural horizontal level. When the handle bar 53 is gripped and pressed with the matching guide 51 and the interference preventing groove 52 of the ring pressing disc 50 adapted to engage the guide slit 11 and the thickness gauge 20, the ring pressure disc 50 is lowered by its pressing force, and simultaneously with this, the ring supporting disc 30 also is lowered in spite of the resilient force of the resiliency means 40.

At this moment, both sides guide tabs 32 of the ring supporting disc 30 are lowered in the vertical direction within the guide grooves 13 of the master bore 10. Since the interference preventing groove 31 passes the thickness gauge 20, the ring supporting disc 30 is maintained naturally at a horizontal level.

The resiliency means 40 is resiliently compressed by the descending force of the ring supporting disc 30.

Accordingly, the piston 60, engaged by the ring pressing disc 50, is continuously compressed to the position where the gap t is aligned with the tolerance thickness of the thickness gauge 20, When the gap reaches the tolerance thickness which is bigger than the gap t, the ring pressing disc 50 can no longer be lowered.

Therefore, the gap in the piston ring 60 passes the tolerance thickness portion of the thickness gauge 20 until it engages the thickness gauge which defines the size of the gap t of the piston ring. Thus the size of the gap t of the piston ring 60 can be exactly measured by reading the tolerance scale 12 of the master bore 10 positioned by the guide 51 of the ring pressing disc 50.

Because the above-described series of steps progress quite rapidly, the measuring time is remarkably reduced, and because the amount of tolerance is measured by the tolerance scale 12 positioned by the guide 51, there is no concern regarding the occurrence of measuring errors by different individuals.

Since the present invention can rapidly and exactly measure the gap of a piston ring by exactly maintaining the horizontal level of a gap measuring device, it is possible to reduce the measuring time and reduce the occurrence of measuring error.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A piston ring gap measuring device for a vehicle comprising:

a master bore containing a guide slit extending in the axial direction from a top edge thereof to a predetermined level along the side thereof and having a diameter for corresponding to an inner diameter of a piston ring of the vehicle, said master bore having a tolerance scale provided in increasing intervals along the guide slit, a thickness gauge having a tower shape which gradually increases from the top toward the bottom of the master bore, said thickness gauge being fixed in the axial direction to a side of the internal surface of the master bore and being positioned on the opposite side of the master bore from the guide slit of the master bore so that the piston ring may be dropped into the bore until a gap of the piston ring no longer passes along the thickness gauge, said thickness gauge having a plurality of tolerance thicknesses corresponding to the tolerance scale, a ring supporting disc for supporting the piston ring as it is inserted into the master bore, said ring supporting disc containing a groove at the periphery thereof which is larger than the maximum tolerance thickness of the tolerance thicknesses so that it readily passes from the top toward the bottom of the thickness gauge, a resiliency means which resiliently supports the ring supporting disc, said resiliency means being sprinq-biased in the upward direction, and a ring pressing disc containing a guide means and a groove provided at the periphery thereof at mutually opposing positions for engaging the guide slit and the thickness gauge of the master bore, and a handle bar extending from the top surface of the ring pressing disc so that the ring pressing disc can be pressed while maintaining a horizontal level of the piston ring until the gap of the piston ring will not pass the thickness gauge.

2. The piston ring gap measuring device for a vehicle as defined in claim 1, further comprising:

additional guide grooves formed along the axial direction at both sides of the internal surface of the master bore between the guide slit and the thickness gauge, and guide tabs extending from the periphery of the ring supporting disc for maintains the ring supporting disc in a horizontal position by engagement with the additional guide grooves.

* * * * *